United States Patent
Tracy et al.

(10) Patent No.: US 6,789,416 B1
(45) Date of Patent: Sep. 14, 2004

(54) HAND HELD PROBE FOR MEASURING TIRE TREAD WEAR

(76) Inventors: Roger H. Tracy, Unit 1610, 680 N. Lake Shore Dr., Chicago, IL (US) 60611; Edwin H. Reeves, 58 Lyme Bay, Columbia, SC (US) 29212; Nicholas J. Radclyffe, The Old Dairy, Nup End Lane, Wingrave HP22 4PX (GB); Robert Mark Longden, The Yews, Grange Park, Northington S024 9TG (GB)

( * ) Notice: Subject to any disclaimer, the term of this patent is extended or adjusted under 35 U.S.C. 154(b) by 0 days.

(21) Appl. No.: 09/889,245
(22) PCT Filed: Jan. 14, 2000
(86) PCT No.: PCT/US00/00989

§ 371 (c)(1),
(2), (4) Date: Oct. 10, 2001

(87) PCT Pub. No.: WO00/42409

PCT Pub. Date: Jul. 20, 2000

Related U.S. Application Data

(60) Provisional application No. 60/115,915, filed on Jan. 14, 1999.

(51) Int. Cl.[7] .............................................. G01M 17/02
(52) U.S. Cl. ................................ 73/146; 73/8; 364/560
(58) Field of Search .............................. 73/146, 146.2, 73/146.3, 146.4, 146.5, 146.8, 8; 364/560

(56) References Cited

U.S. PATENT DOCUMENTS

| | | |
|---|---|---|
| 3,918,816 A | 11/1975 | Foster et al. |
| 4,526,030 A | 7/1985 | Vecera, Jr. |
| 4,631,831 A | 12/1986 | Bacher et al. |
| 4,896,964 A * | 1/1990 | Kitazume ................... 356/602 |
| 5,245,867 A * | 9/1993 | Sube et al. ................... 73/146 |
| 5,249,460 A * | 10/1993 | Dory et al. ................. 356/431 |
| 5,485,406 A * | 1/1996 | Wada et al. .................. 33/551 |
| 5,789,668 A * | 8/1998 | Coe et al. ..................... 73/146 |
| 5,987,978 A * | 11/1999 | Whitehead ................... 73/146 |
| 6,034,676 A * | 3/2000 | Egan et al. ................... 701/29 |
| 6,131,455 A * | 10/2000 | Matsumoto et al. .......... 73/146 |
| 6,269,688 B1 * | 8/2001 | Kroll et al. ................... 73/146 |
| 6,327,904 B1 * | 12/2001 | Oldenettel ................... 73/146 |

* cited by examiner

Primary Examiner—Edward Lefkowitz
Assistant Examiner—Andre Allen
(74) Attorney, Agent, or Firm—Michael A. Mann; Nexsen Pruet Adams Kleemeier, LLC

(57) ABSTRACT

A hand-held probe (10) for measuring a tire tread profile comprises a housing (20) with a slit (64) formed parallel to its major axis, a range finder (70) mounted inside the housing (20) in such a way that it can traverse much of the length of the tube while directing light from a laser through a window (60) and onto a tire surface, a bracket (50) that is carried by the proximal end of the tube to enable the user to hold the probe (10) in position against the tire, a serial port (32) for connection with a computer (40), and a handle (30) that houses the batteries for operation and an IR or RF transmitter. The IR or RF transmitter is for transmitting the tire tread profile wirelessly to a computer suitably equipped to receive IR or RF transmissions.

10 Claims, 1 Drawing Sheet

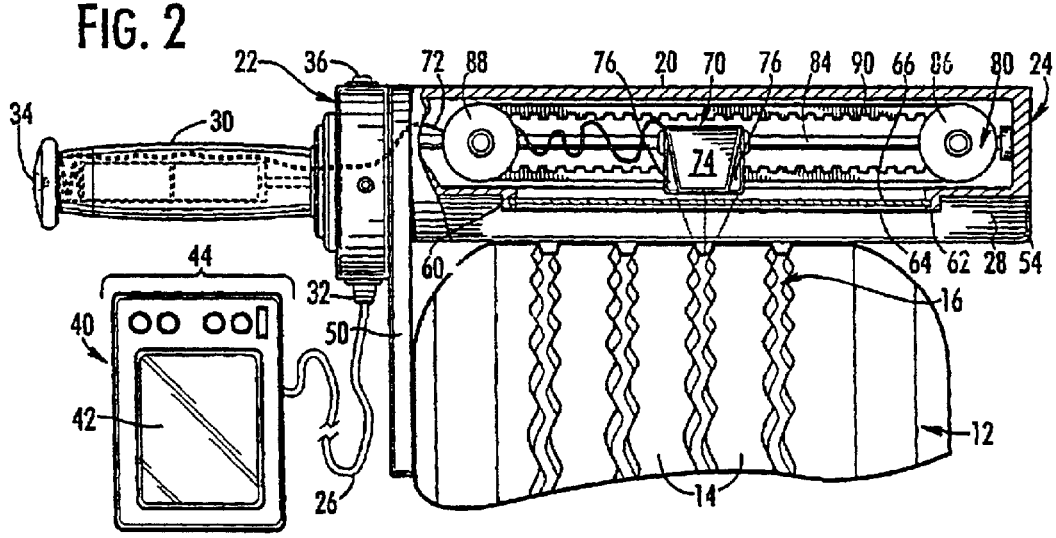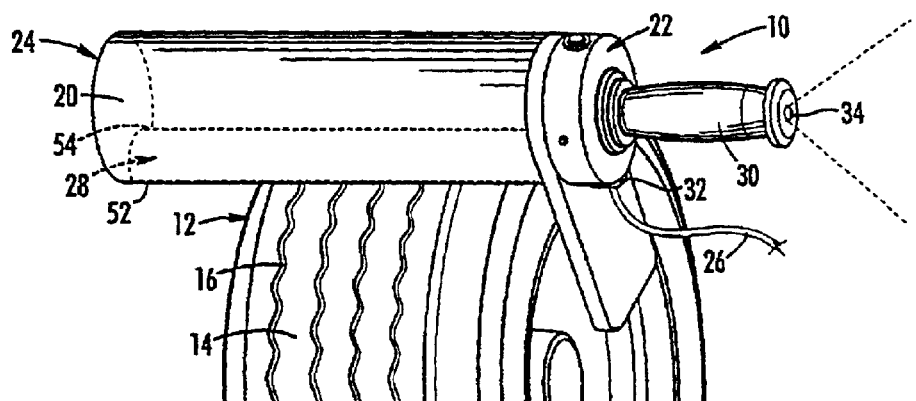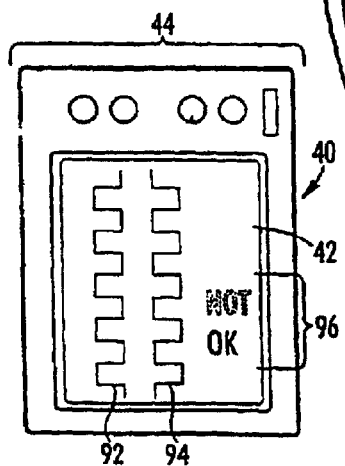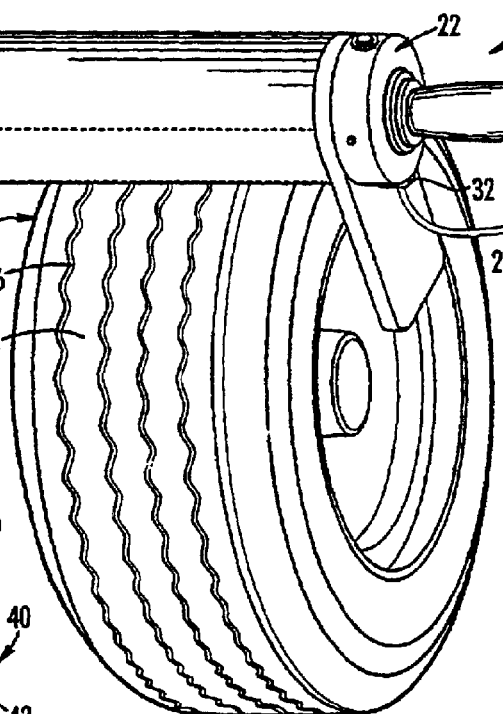

HAND HELD PROBE FOR MEASURING TIRE TREAD WEAR

PRIORITY CLAIM

This application claims the benefit of U.S. Provisional Application No. 60/115,915, filed on Jan. 14, 1999, which is hereby incorporated by reference.

FIELD OF THE INVENTION

The present invention relates to devices for measuring tire tread wear. More specifically, the present invention is a device for determining the tread profile by electro-optical measurements so that tread wear can be quantified.

BACKGROUND OF THE INVENTION

Tire treads are defined by a number of grooves or channels cut into the peripheral portion of the tire. The treads are the portions of the periphery that come into contact with the road.

Tire treads give tires traction in cornering and stopping. Tire treads, however, wear during the course of use. Eventually, treads wear to the point where their ability to provide traction is compromised and the tire needs to be replaced or recapped.

Because tire treads wear slowly, and the amount of wear from day to day or week to week is imperceptible, frequent checking is unnecessary. Yet, unless a tire is checked for the depth of its treads at some reasonable internal, an excessively worn tire can be overlooked. Checking tire tread depth at intervals can allow a reasonably prediction as to when the tire will need to be replaced. Furthermore, such a prediction cannot be made, and, indeed, the amount of tread remaining can be difficult to quantify, without a measurement.

Many states have requirements about the condition of the treads of a tire and require the replacement of tires when they become excessively worn. Fleet managers may have their own internal requirements for replacement of tires that are worn based on tread depth or after a specified number of miles. Simple gauges or rulers are simply not accurate enough. Accurate measurement of tire tread depth is difficult to do without removing the tire and measuring the tread with special electro-optical measuring devices. See for example, the patents of Sube et al issued Sep. 21, 1993, U.S. Pat. No. 5,245,867, and Dory et al, issued Oct. 5, 1993, U.S. Pat. No. 5,249,460. In order to obtain an accurate measurement, the tire is suspended so that it is not engaging a surface. These devices are expensive and require a good deal of time and effort for checking the depth of the tread of a single tire. However, there remains a need for accurate tire tread depth measurement that does not have the defects of the prior art and that measures the profile of the tire tread so that tread depth ran be quantified.

SUMMARY OF THE INVENTION

According to its major aspects and briefly recited, the present invention is a probe for measuring the profile of a tire tread. A tire tread profile is a two-dimensional plot of the distance from each point on a fixed reference line running across the tire from side to side to the nearest point on the tire surface. This plot will show the differences in the distances to the line for the treads and the channels and thus the amount of wear on the treads. The hand held probe comprises a housing with a slit formed parallel to its major axis, a handle attached to the proximal end of the housing, a range finder mounted inside the housing in such a way that it can traverse much of the length of the tube while directing light from a laser through a window mounted over the slit, and a bracket that is carried near the proximal end of the tube to enable the user to hold the probe in position against the tire. The output from the device is via a computer port proximate to the handle or an IR or RP transmitter from the end of the handle. Power is supplied to the device by batteries in the handle.

The housing of the probe is placed against the tire with the slit and its window facing the tread. Preferably, the housing has an concave arcuate portion formed therein to define two edges of the housing that can act as supports on either side of the window to rest against the tire. When the device is pushed laterally toward the near side of the tire until it engages the tire, the device is then stabilized and in position to make a measurement. With the housing thus in position, the reference line with respect to the tire is set. The device is activated by pressing an "on" button, causing the range finder to determine the distance from the range finder to the tire as the range finder slowly traverses the length of the housing. The distance data—in terms of x and y coordinates—is fed to the computer via either the computer port on the proximal end of the housing or the IR or RF window on the end of the handle. The computer can display the distance to the tread and to channels between treads as output, thus displaying the profile of the tire. A compute suitably programmed with local tread requirements can also determine if the tire is acceptable or not.

An advantage of the present device is its simplicity of use. The bracket and arcuate housing make it easy to position against the tire so that it is stable. The computer port that supports data transmission to a computer make the results of the measurement quickly available to the user via any computer.

Another advantage of the present invention is that it provides a tire tread profile rather than a series of single distance measurements. The profile of a tire provides more information than any single measurement and is a more reliable indicator of tread wear than a series of individual measurements, and quicker to obtain.

The IR or RP window in the base of the handle is still another feature of the present invention. This window makes it possible to avoid use of a cable when operating the present handheld tire tread profiler.

Other features and their advantages will be apparent to those skilled in the art of tread depth measurement from a carefull reading of the Detailed Description of Preferred Embodiments accompanied by the following drawings.

BRIEF DESCRIPTION OF THE DRAWINGS

In the drawings,

FIG. 1 is a perspective view of the probe according to a preferred embodiment of the preset invention played against a tire;

FIG. 2 is a side, cross sectional view of a detail of the housing of the probe of FIG. 1; and FIG. 3 is a view of a display on the computer on the probe of FIG. 1 with a sample display.

DETAIL DESCRIPTION OF PREFERRED EMBODIMENTS

The present invention is a hand-held probe for measuring the depth of tire treads. Tire treads are integral, radial projections about the circumference of a vehicular tire separated by narrow gaps or channels from each other. FIG. 1 illustrates the present probe, indicated by reference number 10 in position for a measurement against a tire 12 with treads 14. Gaps 16 are between treads 14. Probe 10 determines the difference in radial distance between the bottom of gaps 16 and the tops of treads 14 and whether this difference meets whatever preselected requirements are imposed by the user or other authority.

Probe 10 comprises a generally cylindrical housing 20 having a proximal end 22 and a distal end 24. Housing 20 is made of light-weight tubing such as aluminum, steel, plastic such as nylon, or composite materials. A handle 30 is fitted on proximal end 22 and an on/off button 36. Near handle is serial port 32 for connection to a small computer 40 with display 42 and controls 44 via a cable 26. Computer 40 is preferably of the size of a palmtop computer such as that sold under the brand name PALM PILOT, CASSIOPEIA or PSION. These types of computers can receive data into memory and process them for display and storage in a manner well known in the art. Stored data can later be downloaded to a different computer as desired.

Near proximal end 22 is a bracket 50 for engaging the side of tire 12 for stability and to help in aligning probe 10, as will be described more fully below. Along the major axis of housing 20 is a window 60 having, frame 62 with a slit 64 covered by an optical glass 66 to keep dust sad dirt out of housing 20. The length of slit 64 should be just as wide as the widest tire to be encountered.

Housing 20 is hollow, has a concave arcuate shape along one side at 28 and is dimensioned internally to house a distance range finder 70 and a carrier assembly 80 for moving distance finder 70 along window 60 while enabling range finder 70 to measure distance (Y-coordinate) from it to tire 12 as it moves along housing 20 (X-coordinate) when probe 10 is properly positioned against tire 12. Range finder 70 sends measurement data to computer 40 by internal cable 72 for computation and display of results either through serial port 32 or IR (infrared) or RF (radio frequency) transmission window 34 in the base of handle 30. By measuring distance between the reference line, which is defined by the location of the distance finder 70 as it traverses housing 20, and the nearest point on tire 12, the tire profile along its rolling face from side to side can be determined and, by subtraction from the reference, the difference in distance between the top of treads 14 and the bottom of gaps 16. This difference will either meet or not meet a preselected criterion storable in computer 40. Computer 40 may be programmed to apply local criteria to the distance measurement and thus produce an "OK" or "NOT OK" along with the distance 92 and the profile 94, as shown in FIG. 3.

During operation, probe 10 is held against tire 12 with the plane of window 60 parallel to the tangent of tire 12 and the two edges 52, 54 of housing 20 against the surface of tire 12 and bracket 50 against the side of tire 12. This "three-point" contact allows probe 10 to have a complete view of tread 14's cross section and be stable for the measurement. Stability is important to preserve the integrity of the line of reference to the tire defied by the movement of the range finder 70

Range finder 70, which is mounted on the inside of housing 20 can measure the distance from a reference point to any opaque object directly in front of it. Range finder 70 must have a range of operation not less than one inch in front of it and not more than two inches away from the device; that is, it must be capable of the measuring the distance to an object as close as one inch and as distant as two inches away. This range allows range finder 70 to function through the thickness of the glass 64 and still have sufficient range to reach the bottom of a gap between treads of a deep truck tire. Range finder 70 must have very tight field of view so as to be able to accurately detect the edge of treads 14 and not produce false readings taken partially on top of treads 14 and partially in gaps 16.

Range finder 70 employs a diode laser light source 74 and two linear position sensors 76 arranged so as to be able to measure the distance to tire 12 when probe 10 is positioned properly against tire 12. Light source 74 is fitted with optics to produce a tightly focused light spot on tire 12. Light is project toward tire 12 on a line which is parallel to a tire radius vector. An image of the spot on tire 12 is then focused on the linear position sensor 76. Linear position sensors 76 produce electrical signals proportional to the location of the spot on the sensor surface. The sensor is positioned at an angle to the laser so that the location of the focused spot on the sensor therefore functions as a laser triangulation distance measurement device.

The depth of gap 16 can be large compared to its width The narrow shape of gap 16 can block the view of a single linear position sensor when the laser spot is at the bottom of gap 16. This problem is most evident when the spot drops into gap 16 with the edge of tread 14 on the same side as that position sensors. To improve measurements on in gaps 16, the present range finder 70 uses two position sensors 76. Sensors 76 are mounted at complementary angles on either side of laser light source 74. This improves the percentage of the width of the bottom of gaps 16 that can be measured.

To measure a compete cross section of tire 12, range finder 70 scans across tire 12's width carried by carrier assembly. Range finder 70 is mounted on a linear be 82 and guided with a rod 84 mounted parallel to the central axis of housing 20. A pulley 86, 88, is mounted at each end of rod 84 and motor-driven, toothed belt 90 is fitted between pulleys 86, 88. The motor-driven belt 90 is used to move range finder 70 along the length of rod 84 while measurement is being taken. The motor is not shown since this type of mechanism, similar to that of a printer head carrier is well known to those skilled in the art. See for example U.S. Pat. No. 5,162,916. Batteries 98 to power the range finder motor are located in handle 30.

The position of range finder 70 along rod 84 may be measured by a displacement transducer (not shown) or tacked using a stepper motor (not shown) on belt 90.

The tread profile is a data set consisting of points containing an X-coordinate which is the position of range finder 70 on guide rod 84 and a Y-coordinate which is the distance from range finder 70 to the surface of tire 12. These coordinates are transmitted to computer 40 by means of suitable and conventional data link such as cable 72.

Computer 40 can produce a plot of the data points to enable the user to ensure that the unit is functioning correctly. Display 42 shows a first plot 92 of actual distance to tire 12, a second plot 94 showing the difference in distance between a reference point on tread 14, and an indication as to whether the tread depth is sufficient or not according to a preselected criterion. Clearly various output can also be displayed from the received data, such as average and mean tread depth, minimum tread depth, and so on. Specific criteria as defined by local highway regulators may be applied to determine if the tread is passable. The measurements may also be used to predict when tire replacement will be required or the number of miles until tire replacement based on comparison with stored data about a particular tire or tires in general.

In use, probe 10 is placed against the rolling face of a tire 12 and pushed against tire 12 so that bracket 50 engages the side of tire 12 and window 60 is parallel to the tangent of tire 12 where the edges 52, 54, of probe 10 meet tire 12. Range finder 70 and carrier assembly are activated by pressing on/off button 36. Light source 74 on range finder 70 transmits a beam of well focused light onto tire 12 through window 60 and position sensors 76 adjacent light source 74 on range finder 70 perceive the distance from range finder 70 to tire 12. The data reflective of that distance are transmitted through cable 72 to computer 40 where the data is analyzed and displayed on display 42 for the operator.

It will be apparent to those skilled in the art of tread depth measurement that many modifications and substitutions can be made to the foregoing description of preferred embodiments without departing from the spirit and scope of the present invention, defined by the appended claim.

What is claimed is:

1. A probe for measuring tread depth, said probe comprising:
    a housing having a window formed therein, said housing having a proximal end and a distal end;
    range finding means for finding distance, said range finding means being carried within said housing and oriented so that said range finding means directs a beam of light through said window;
    means for moving said range finding means parallel to said window;
    means carried by said housing for gripping said housing;
    tire-engaging means carried by said housing for engaging a side and two locations on a rolling face of a tire to provide a three-point contact for preserving the integrity of a line of reference to the tire defined by the movement of said range finding means; and
    means carried by said housing and in operational connection with said range finding means and said moving means for sending distance data from said range finding means as said range finding means is moved parallel to said window while a plane of said window is parallel to a tangent of the tire rolling face where engaged by said tire-engaging means.

2. The probe as recited in claim 1, wherein said housing has a concave arcuate shape with opposing edges for engaging the rolling face at two locations to support the housing on a tire.

3. The probe as recited in claim 1, further comprising a communications port means carried by said gripping means for communicating distance data to a computer.

4. The probe as recited in claim 3, wherein said communications port means transmits distance data using an infrared transmission.

5. The probe as recited in claim 3, wherein said communications port means transmits measurement data using a radio frequency transmission.

6. The probe as recited in claim 1, wherein said gripping means is a handle carried by said proximal end of said housing.

7. The probe as recited in claim 3, further comprising a handheld computer, said handheld computer being in electrical communication with said range finding means, and said handheld computer having a display and means for plotting distance data.

8. A probe for measuring tread depth, said probe comprising:
    a housing having a window formed therein, said housing having a proximal end and a distal end;
    range finding means for finding distance, said range finding means being carried within said housing and oriented so that said range finding means directs a beam of light through said window;
    means carried by said housing for gripping said housing;
    tire-engaging means carried by said housing for engaging a side and two locations on a rolling face of a tire to provide a three-point contact for preserving the integrity of a line of reference to the tire defined by the movement of said range finding means;
    means for moving said range finding means parallel to the line of reference; and
    means carried by said housing and in operational connection with said range finding means and said moving means for sending distance data from said range finding means as said range finding means is moved parallel to the line of reference while a plane of said window is parallel to a tangent of the rolling face where engaged by said tire-engaging means.

9. The probe as recited in claim 8, wherein said range finding means measures distance to said tire face by triangulation.

10. The probe as recited in claim 8, wherein said range finding means further comprises two sensors and a light source for directing said beam of light, said sensors located on either side of said light source.

* * * * *